Aug. 24, 1954
T. A. ST. CLAIR
2,687,143
REGULATOR
Filed March 11, 1950
2 Sheets-Sheet 1
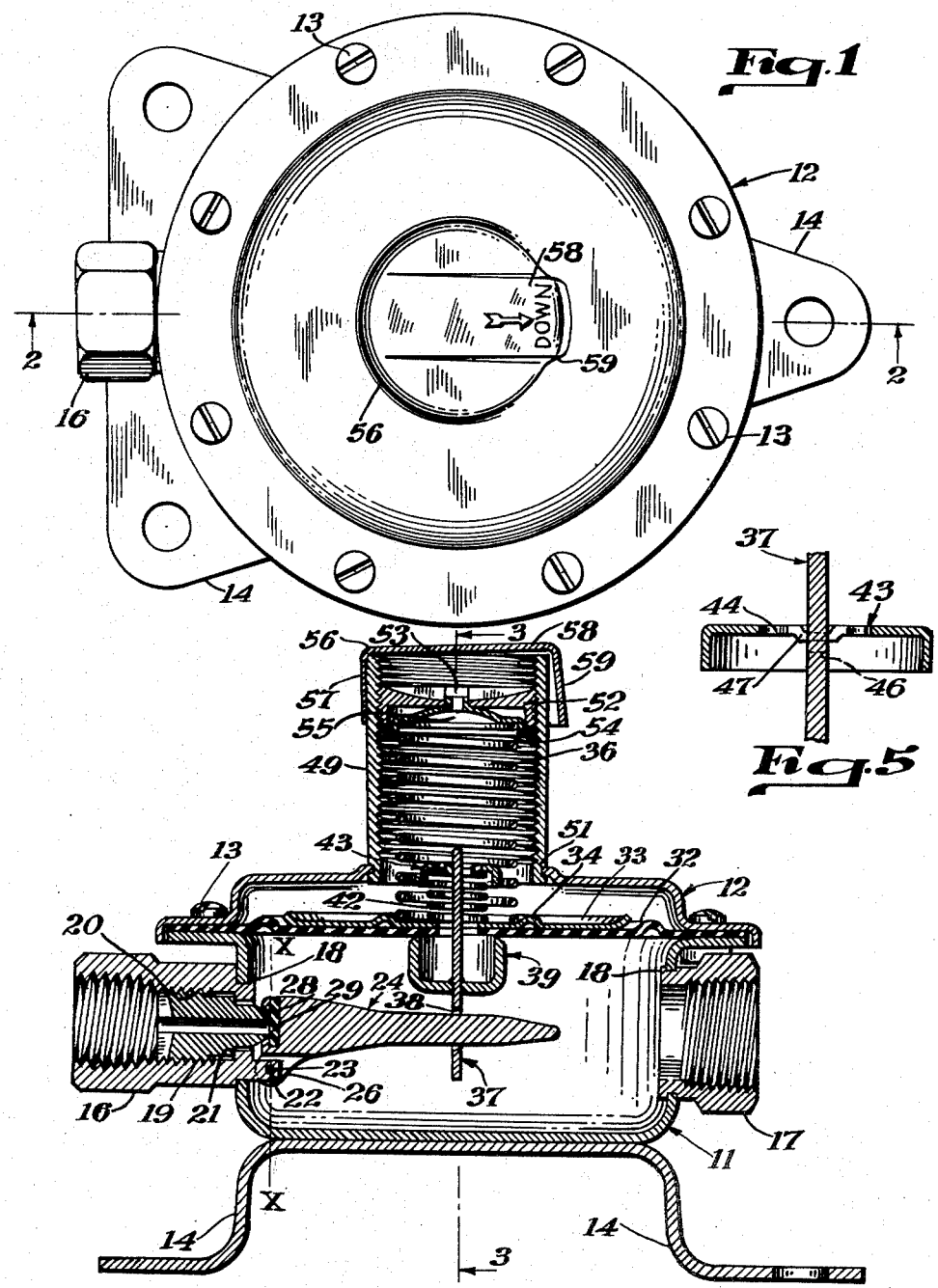
INVENTOR.
THEODORE A. ST. CLAIR.
BY Richey & Watts
ATTORNEYS.

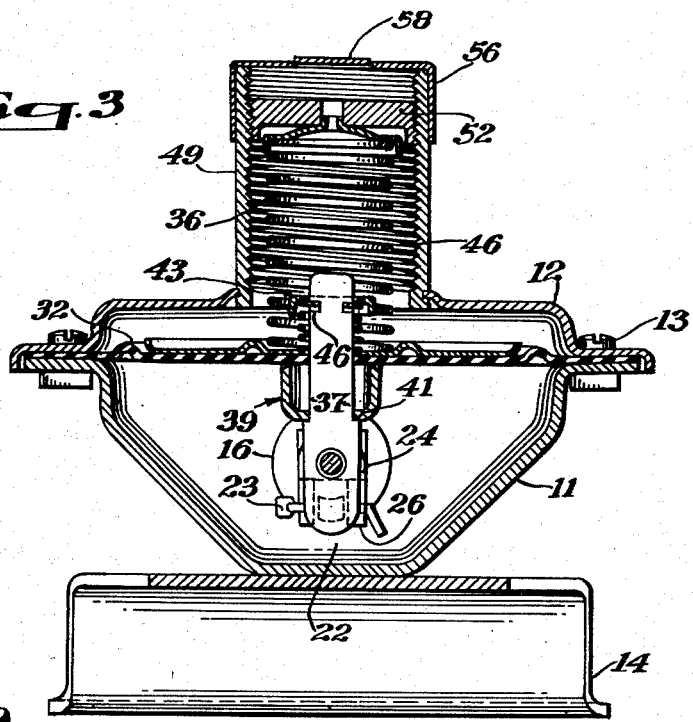

Patented Aug. 24, 1954

2,687,143

UNITED STATES PATENT OFFICE 2,687,143

REGULATOR

Theodore A. St. Clair, Cleveland, Ohio, assignor to The Weatherhead Company, Cleveland, Ohio, a corporation of Ohio Application March 11, 1950, Serial No. 149,073

3 Claims. (Cl. 137—525.5)

This invention relates to pressure regulators of the type employed for supplying fluid at a reduced pressure from a relatively high-pressure source.

One application of the invention is for use in liquefied petroleum gas installations and similar systems in which the pressure of gas flowing from a container is substantially reduced and maintained at a substantially constant value through a considerable range of flow and with a steadily dropping inlet or source pressure.

An object of the invention is to simplify, lighten, and make more economical the assembly of certain regulator parts as well as to improve the flow pattern of the regulator and increase its sensitivity. In addition, it is an object of the invention to provide a regulator with pressure relief means that is simple and economical in its construction and dependable in operation. According to the invention the operating stem connecting to the regulator diaphragm is combined with relief valve structure so that these parts are formed of three simple stampings which are assembled and connected in a novel manner, thereby making these parts economical to produce and light in weight, the latter factor in turn making the regulator more sensitive and assisting in maintaining a more constant flow pattern.

Another object resides in improving the action at the regulator valve so that the adjustment thereof will be maintained, the flow pattern uniform, the life of the valve seat improved, and the whole structure economically manufactured. According to the invention, the valve member is pivoted to a support that forms part of the valve seat assembly with the pivot being in the plane of the valve seat. Thus, there is no relative radial motion of the hard and soft seats with attendant scuffing of the soft valve disk on the valve member as the latter opens and closes, and since the valve member is pivotally mounted directly on the inlet fitting alignment between the fixed and movable valve parts is always perfectly maintained, and no adjustment for either part need be provided to produce and hold their alignment.

Another feature of the invention resides in a novel assembly of the soft seat with the valve member whereby the resiliency of the soft valve seat material (such as rubber or the like) is employed to retain it in place so that the soft valve disk is under no stresses other than that imposed by its pressure against the valve seat.

Another object is to completely exclude water and dirt from the atmospheric side of the regulator while simultaneously providing a vent for that side, which exclusion is cheaply accomplished by means that are readily detached without need for tools. This is accomplished by providing a plastic valve cap of improved water shedding characteristics formed to provide a protected vent and formed to frictionally snap over the spring housing of the regulator so that removal may be readily effected without the use of tools.

The manner in which these and other objects and advantages may be accomplished will be apparent from the following detailed description of a preferred embodiment of the invention.

Referring to the drawings:

Fig. 1 is a plan view of a regulator in accordance with the invention;

Fig. 2 is a sectional view on the plane 2—2 of Fig. 1;

Fig. 3 is a sectional view of the plane 3—3 indicated in Fig. 2;

Fig. 4 is a view of the spring retainer for the relief valve;

Fig. 5 is a fragmentary enlarged section of the stem and relief valve spring seat as it appears in Fig. 2;

Fig. 6 is an end elevation of the movable valve member during assembly of the soft seat;

Fig. 7 is a section taken on 7—7 of Fig. 6;

Fig. 8 shows a modified form of cap; and,

Fig. 9 is a section taken on 9—9 of Fig. 8.

The regulator comprises a casing consisting principally of a body stamping 11 and a cover stamping 12, these parts being formed from sheet metal, and including peripheral flanges which are held together by bolts 13. A mounting bracket or foot 14 bent from sheet metal and spot-welded to the body 11 provides for the mounting of the regulator. An inlet fitting 16 and an outlet fitting 17 are fixed in the body, these fittings being threaded or tapped in any standard manner or otherwise adapted for the connection of high pressure inlet and low pressure outlet pipes or other fittings (not shown). These fittings are preferably secured temporarily by rolling over the flange or beads as indicated at 18, and are then hydrogen brazed to the casing to provide a gas-tight seal and a high degree of mechanical strength.

A nozzle 19 is threaded into the inlet fitting as at 20 and seats against a gasket 21. As will be noted, this nozzle projects into the body of the regulator and is formed with a conical end forming a valve seat. The inlet fitting 16 is integrally formed with a boss 22 extending into the casing below the nozzle and drilled at right angles to the axis of the nozzle to receive a pivot pin 23 which forms a fulcrum for the movable valve member 24, formed and mounted as a lever. The lever 24 is formed with depending ears 26 which lie on each side of the boss 22 and are drilled for the fulcrum pin 23, which may conveniently be formed of wire flattened at one end and bent over at the other end after assembly so that it will remain in place.

The portion of the lever 24 above the fulcrum confronts the end of the nozzle and is formed with a conical recess 27 (Figs. 6 and 7) coaxial with and surrounding the conical tip of the nozzle 19. The recess 27 is terminated by a slot 28 cut entirely across the lever and extending from the upper surface of the lever nearly to the lower surface.

A resilient closure member or soft seat member 29 of rubber-like material is mounted in the slot 28 in position to engage the nozzle valve seat. The normal thickness of the rubber-like material 29 is somewhat greater than the width of the slot so that the sealing member may be retained by its own elasticity. As seen in Figs. 6 and 7, the sealing member is assembled in the lever by stretching a strip of the material to reduce its thickness, lowering it into the slot, and releasing the ends of the strip, so that the longitudinal contraction increases the thickness of the strip and holds it in place. The ends of the strip are then trimmed flush with the side faces of the lever 24. When the valve is closed (Fig. 2) the fulcrum 23, the face of soft seat 29, and the valve seat on the nozzle all lie in a common plane $x-x$, so that the valve opens and closes without scuffing. Alignment is always maintained because of the integral, nonadjustable boss 22 and the fixed nozzle.

The valve is closed when the pressure within the casing or body 11 reaches the value for which the valve is set, the valve being closed by a flexible diaphragm 32, the margin of which is compressed between the flanges of the body and cover by the bolts 13. The central portion of the diaphragm is reinforced by a sheet metal backing plate 33 embossed to provide an annular rib 34 to locate a compression spring 36 which biases the diaphragm in opposition to the fluid pressure. The plate 33 and the diaphragm 32 are formed with a central opening and are cemented together at their inner margins.

A light, economical, and readily-assembled stem and relief valve assembly is provided. The diaphragm 32 is coupled to the lever 24 by a stem member 37 in the form of a flat metal strip readily formed by stamping. The lever 24 projects through a hole 38 in the stem which is formed to provide a knife-edge fulcrum for the lever 24. A relief valve member in the form of a stamped cup 39 is mounted on the member 37 in position to engage the diaphragm 32 around the central opening. The cup 39 is formed with a slot through which the member 37 is passed and abuts a shoulder 41 on the tension member. The parts 37 and 39 are brazed or soldered together to prevent escape of fluid past the slot in cup 39. The margin of the cup 39 is chamfered to provide a knife-edge contact between the cup and the diaphragm. The cup is normally urged upwardly into contact with the diaphragm by a relief valve spring 42 compressed between the upper face of the plate 33 and a spring seat disk or retainer 43 mounted on the the upper end of the tension member 37. As is more clearly shown in Figs. 4 and 5, the spring seat 43 is provided with a flange to locate the spring 42 radially, and is formed with a slot 44 through which the upper end of the stem 37 may be passed. The edges of the stem 37 are notched as indicated at 46 (Figs. 3 and 5) and the seat is provided with depressed sockets 47 (Figs. 4 and 5) at right angles to slot 44. The stem may be slipped over the stem member and then rotated 90 degrees, whereupon the spring 42 holds the abutments defined by the slots 46 in the pockets 47. Thus, the relief valve and stem assembly is economically produced, readily assembled, and light in weight, improving the sensitivity of the regulator.

The relief valve spring 42 is of relatively light tension. If, as may happen when the flow of fluid from the regulator is cut off externally, fluid seeps past the main valve member 29, the pressure on the diaphragm increases to a value somewhat beyond the normal range of output pressures desired, and is then sufficient to compress the relief valve spring 42, relieving the pressure within the body so that no harmful excess of pressure can be exerted against the diaphragm or against elements of the system supplied by the regulator.

The main or regulating spring 36 is contained within a tubular sleeve or housing 49 which may be spun, hydrogen brazed, or otherwise secured in a central opening 51 of the cover. It is not essential that this joint be fluid-tight, although it is best that it be so to prevent any possibility of the entrance of rain water or other foreign matter. The housing 49 is internally threaded to receive an adjustable spring base nut 52 formed with a transverse slot 53 extending through the abutment. The upper end of the spring 36 fits within a flanged, domed disk 54 which presses against the abutment 52 and is formed with a vent opening 55 communicating with slot 53 in the adjusting nut.

The upper end of the housing 49 is closed by a cap 56 formed with a circumferential flange 57 which tightly fits the housing around most of the perimeter. A portion of the upper surface of the cap is deformed or embossed upwardly as indicated at 58 and is aligned with an outwardly deformed or embossed portion 59 of the flange of the cap so that a vent passage is formed between the portions 58 and 59 of the cap and the upper end of the sleeve or spring housing 49. Atmospheric pressure is admitted to the upper surface of the diaphragm, and gas released from the valve escapes from the regulator, through the housing 49, passing through the openings 55 and 53 and under the cap 56. The cap 56 is preferably a press fit, but may be loosened for removal by striking the projection 59 or by exerting compression between the portion 59 and the opposite margin of the cap. The position of the cap is immaterial when the regulator is mounted so that the diaphragm is horizontal. When the diaphragm is vertical the breather outlet 59 should be at the lower edge of the cap, and for this reason an arrow and the legend "Down" are applied to the cap as shown in Fig. 1.

Figs. 8 and 9 show a modified form of cap which is molded of plastic material such as polyethylene. The cap has a cylindrical portion 61 for sliding over the sleeve of the regulator, a bulged or domed portion 62 which is relieved as at 63 to provide a vent, and surrounding the vent is a beveled mouth portion 64 which acts to prevent the direct ingress of water, dirt or rain through the vent. Since the cap is made of the aforesaid plastic material, water does not adhere thereto but rather quickly runs off, the advantage of this being that there is no tendency for water to build up into the vent apertures and freeze therein thereby blocking the vent.

Having thus described the present invention so that others skilled in the art may be able to understand and practice the same, I state that what I desire to secure by Letters Patent is defined in what is claimed.

What is claimed is:

1. A valve comprising a casing, an inlet nozzle, and a rigid valve member in said casing for closing said nozzle; said valve member comprising a ring for surrounding the end of said nozzle, a body having a substantially flat face facing said nozzle, and a connection between said ring and body forming a transverse slot bounded by said ring, connection, and body face, said slot providing spaced substantially parallel walls, an elastic member of rubber-like material having an unstressed thickness greater than the spacing of said walls disposed in said slot for engaging the nozzle, said elastic member being retained in said slot by compression of the rubber-like material by the walls of said slot, said slot being open whereby said elastic member may be inserted therein in a stretched condition and thereafter be allowed to contract and press against said ring and body face.

2. A method of securing a resilient seal in a valve member comprising forming a rigid valve member with a recess in the forward face thereof adapted to receive a valve seat and a transverse slot spaced from said face intersecting said recess, said slot providing spaced substantially parallel walls, the spacing of the walls being less than the unstressed thickness of said seal, and positioning said seal in said slot while under tension thereby reducing the thickness thereof and releasing the tension after the seal is positioned in said slot.

3. A valve member comprising a ring for surrounding the end of a nozzle, a body having a substantially flat face facing said nozzle, and a connection between said ring and said body forming a transverse slot bounded by said ring, connection, and body face, said slot providing spaced substantially parallel walls, and an elastic member of rubber-like material having an unstressed thickness greater than the spacing of said walls disposed in said slot for engaging the nozzle, said elastic member being retained in said slot by compression of the rubber-like material by the walls of said slot, said slot being open whereby said elastic member may be inserted therein in a stretched condition and thereafter be allowed to contract and press against said ring and body face.

References Cited in the file of this patent

UNITED STATES PATENTS

| Number | Name | Date |
|---|---|---|
| 341,295 | Westinghouse | May 4, 1886 |
| 931,056 | Glanz | Aug. 17, 1909 |
| 1,004,298 | O'Brien | Sept. 26, 1911 |
| 1,104,865 | Barrington | July 28, 1914 |
| 1,461,738 | Rumpf | July 17, 1923 |
| 1,831,000 | Hawkinson | Nov. 10, 1931 |
| 1,871,984 | Hoffman | Aug. 16, 1932 |
| 2,026,793 | McKee | Jan. 7, 1936 |
| 2,263,581 | Hughes | Nov. 25, 1941 |
| 2,290,177 | Grant | July 21, 1942 |
| 2,306,746 | Niesemann | Dec. 29, 1942 |
| 2,319,659 | Cames | May 18, 1943 |
| 2,575,240 | Thompson | Nov. 13, 1951 |